US010536726B2

(12) United States Patent
Zhou et al.

(10) Patent No.: US 10,536,726 B2
(45) Date of Patent: Jan. 14, 2020

(54) PIXEL PATCH COLLECTION FOR PREDICTION IN VIDEO CODING SYSTEM

(75) Inventors: Xiaosong Zhou, Campbell, CA (US); James Oliver Normile, Los Altos, CA (US); Hsi-Jung Wu, San Jose, CA (US)

(73) Assignee: APPLE INC., Cupertino, CA (US)

( * ) Notice: Subject to any disclaimer, the term of this patent is extended or adjusted under 35 U.S.C. 154(b) by 339 days.

(21) Appl. No.: 13/463,547

(22) Filed: May 3, 2012

(65) Prior Publication Data
US 2013/0223525 A1    Aug. 29, 2013

Related U.S. Application Data

(60) Provisional application No. 61/603,047, filed on Feb. 24, 2012.

(51) Int. Cl.
*H04N 19/103* (2014.01)
*H04N 19/105* (2014.01)
*H04N 19/97* (2014.01)

(52) U.S. Cl.
CPC .................................. *H04N 19/97* (2014.11)

(58) Field of Classification Search
None
See application file for complete search history.

(56) References Cited

U.S. PATENT DOCUMENTS

| 5,592,228 | A | * | 1/1997 | Dachiku | H04N 19/00 348/416.1 |
| 5,864,342 | A | * | 1/1999 | Kajiya | G06T 11/001 345/418 |
| 5,867,166 | A | * | 2/1999 | Myhrvold | G06T 11/001 345/419 |
| 5,977,977 | A | * | 11/1999 | Kajiya | G06T 11/001 345/418 |
| 6,008,820 | A | * | 12/1999 | Chauvin | G06T 11/40 345/502 |
| 6,081,551 | A | * | 6/2000 | Etoh | G06T 9/001 375/240 |

(Continued)

OTHER PUBLICATIONS

Paul et al., "Explore and Model Better I-Frames for Video Coding," IEEE Transactions on Circuits and Systems for Video Technology, 21(9):1242-1254, Sep. 2011.

*Primary Examiner* — Philip P. Dang
(74) *Attorney, Agent, or Firm* — BakerHostetler

(57) ABSTRACT

In a video coding system, an encoder may include a coding engine to predictively code input video, a decoder to reconstruct reference pictures generated by the coding engine, a reference picture cache to store the reconstructed reference pictures, a patch cache to store prediction patches generated from other sources, and a prediction search unit to search among the reference picture cache and the patch cache to generate prediction references for use by the coding engine while coding input video. The prediction patches may be assembled from a variety of sources including: predefined image content, reference pictures being evicted from the reference picture cache, image content of prior coding sessions and image data stored by applications on a common terminal where the encoder resides. A decoder may store prediction patches in its own patch cache for synchronous decoding.

63 Claims, 5 Drawing Sheets

(56) References Cited

U.S. PATENT DOCUMENTS

| | | | |
|---|---|---|---|
| 6,252,608 B1* | 6/2001 | Snyder | G06T 11/001 |
| | | | 345/422 |
| 6,292,194 B1* | 9/2001 | Powell, III | G06T 11/001 |
| | | | 345/582 |
| 6,744,438 B1* | 6/2004 | Baldwin | G06T 11/40 |
| | | | 345/531 |
| 6,826,228 B1* | 11/2004 | Hui | H04N 19/159 |
| | | | 375/240.02 |
| 6,904,174 B1* | 6/2005 | Keith | H04N 19/105 |
| | | | 375/E7.133 |
| 7,302,001 B2* | 11/2007 | Wang | H04N 19/105 |
| | | | 375/240.1 |
| 7,356,679 B1* | 4/2008 | Le | G06F 17/30067 |
| | | | 713/1 |
| 8,090,025 B2 | 1/2012 | Sakazume | |
| 8,280,159 B2* | 10/2012 | Kojima | H04N 19/176 |
| | | | 382/166 |
| 8,335,379 B2* | 12/2012 | Malik | G06T 7/11 |
| | | | 382/173 |
| 2001/0024473 A1 | 9/2001 | Nakaya et al. | |
| 2002/0018525 A1 | 2/2002 | Nishi et al. | |
| 2002/0140805 A1 | 10/2002 | Gutta et al. | |
| 2002/0191112 A1 | 12/2002 | Akiyoshi et al. | |
| 2004/0141206 A1 | 7/2004 | Kim | |
| 2005/0257239 A1 | 11/2005 | Evans et al. | |
| 2006/0098738 A1* | 5/2006 | Cosman | H04N 19/159 |
| | | | 375/240.16 |
| 2006/0115001 A1* | 6/2006 | Wang | H04N 19/105 |
| | | | 375/240.24 |
| 2006/0294171 A1* | 12/2006 | Bossen | H04N 19/139 |
| | | | 708/300 |
| 2008/0056358 A1* | 3/2008 | Fuchie | H04N 19/159 |
| | | | 375/240.12 |
| 2008/0212682 A1* | 9/2008 | Kalva | H04N 19/61 |
| | | | 375/240.21 |
| 2008/0232470 A1 | 9/2008 | Park et al. | |
| 2008/0247463 A1 | 10/2008 | Buttimer et al. | |
| 2009/0180542 A1 | 7/2009 | Leprovost et al. | |
| 2009/0225193 A1 | 9/2009 | Ishii | |
| 2009/0251528 A1 | 10/2009 | Friel et al. | |
| 2009/0323801 A1* | 12/2009 | Imajou | H04N 21/431 |
| | | | 375/240.01 |
| 2010/0034379 A1 | 2/2010 | Nakane | |
| 2010/0239000 A1 | 9/2010 | MacDonald et al. | |
| 2010/0296579 A1 | 11/2010 | Panchal et al. | |
| 2010/0032933 A1 | 12/2010 | Sohn et al. | |
| 2011/0026582 A1* | 2/2011 | Bauza | G06T 3/4007 |
| | | | 375/240.02 |
| 2011/0150090 A1 | 6/2011 | Hugosson et al. | |
| 2011/0170611 A1* | 7/2011 | Lai | H04N 19/51 |
| | | | 375/240.24 |
| 2011/0026188 A1 | 10/2011 | Zheng et al. | |
| 2012/0047535 A1* | 2/2012 | Bennett | G09G 3/003 |
| | | | 725/62 |
| 2012/0257672 A1* | 10/2012 | Yang | H04N 19/126 |
| | | | 375/240.03 |
| 2012/0275514 A1* | 11/2012 | Leontaris | H04N 19/105 |
| | | | 375/240.02 |
| 2013/0279810 A1* | 10/2013 | Li | G06K 9/00724 |
| | | | 382/195 |

* cited by examiner

100

200

300

600

700

PIXEL PATCH COLLECTION FOR PREDICTION IN VIDEO CODING SYSTEM

CROSS-REFERENCE TO RELATED APPLICATIONS

This application claims the benefit of U.S. Provisional Application Ser. No. 61/603,047 filed on Feb. 24, 2012, the content of which is incorporated herein it its entirety.

BACKGROUND

The present invention relates to video coding and, in particular, to predictive coding techniques based on prediction patches.

Motion compensation is commonly used as prediction in modern video compression standards to exploit temporal redundancy across frames. A first encoded frame serves as a prediction reference for one or more subsequently-coded frames. In such systems, a video coder codes the first frame and transmits the coded data to a remote video decoder. The video coder itself decodes the first coded frame and stores the recovered frame locally for use as a prediction reference for later frames. Since video coding techniques typically are lossy, the recovered frame likely will have some coding-induced errors when compared to its source. However, the video coder and video decoder each may obtain a common copy of the recovered frame, absent transmission errors, which provide an adequate basis for coding.

A video coder uses locally decoded video (called, "reference frames" herein) to generate prediction data when coding a later-received frame. The video coder parses frames into pixel blocks and codes the frame on a pixel block-by-pixel block basis. The video coder searches for a prediction reference among locally-stored reference frames and, when one is found, the video coder codes a difference between the predicted data and source content of the later-received frame.

High coding efficiency can be achieved using motion compensated prediction techniques. However, temporal correlation in the video sequence can be broken, for example, on a scene change, when there is camera movement, in the presence of high level noise, etc. Further, a video coder and decoder typically store a limited number of reference frames which may fail to provide good prediction when temporal correlation is low. Accordingly, there is a need in the art for a video coding system that can exploit benefits of predictive coding techniques when reference frames become poor predictors for a video sequence being coded.

DETAILED DESCRIPTION

Embodiments of the present invention provide a coding system in which an encoder may include a coding engine for predictively coding input video, a decoder to reconstruct reference pictures generated by the coding engine, a reference picture cache to store the reconstructed reference pictures, a patch cache to store prediction patches generated from other sources, and a prediction search unit to search among the reference picture cache and the patch cache to generate prediction references for use by the coding engine while coding input video. The prediction patches may be assembled from a variety of sources including: predefined image content, reference pictures being evicted from the reference picture cache, image content of prior coding sessions and image data stored by applications on a common terminal where the encoder resides. The prediction patches are likely to persist in the encoder for a time longer than reference pictures stored in the reference picture cache and, as such, might provide good correlation to input video data in circumstances where low correlation is provided by the reference picture cache. A decoder may store prediction patches in its own patch cache for synchronous decoding.

Figure 1:
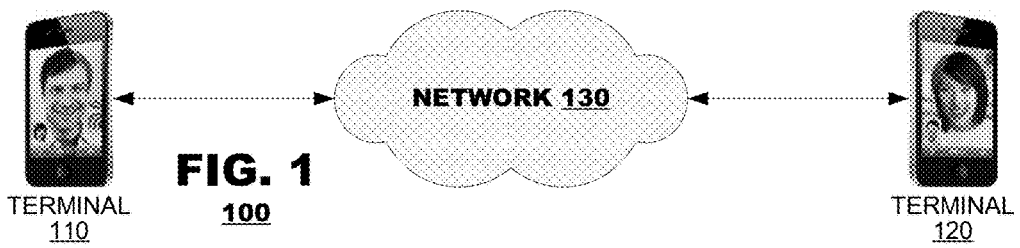
FIG. 1 illustrates a video coding system according to an embodiment of the present invention.

FIG. 1 illustrates a video coding system 100 according to an embodiment of the present invention. The system 100 may include a plurality of terminals 110, 120 interconnected via a network 130. The terminals 110, 120 each may capture video data at a local location and code the video data for transmission to the other terminal via the network 130. Each terminal 110, 120 may receive the coded video data from the other terminal from the network 130, decode the coded data and display the recovered video data.

In FIG. 1, the terminals 110, 120 are illustrated as smart phones but the principles of the present invention are not so limited. Embodiments of the present invention find application with personal computers (both desktop and laptop computers), tablet computers, computer servers, media players and/or dedicated video conferencing equipment. The network 130 represents any number of networks that convey coded video data between the terminals 110, 120, including for example wireline and/or wireless communication networks. The communication network 130 may exchange data in circuit-switched and/or packet-switched channels. Representative networks include telecommunications networks, local area networks, wide area networks and/or the Internet. For the purposes of the present discussion, the architecture and topology of the network 130 are immaterial to the operation of the present invention unless explained hereinbelow.

Figure 2:
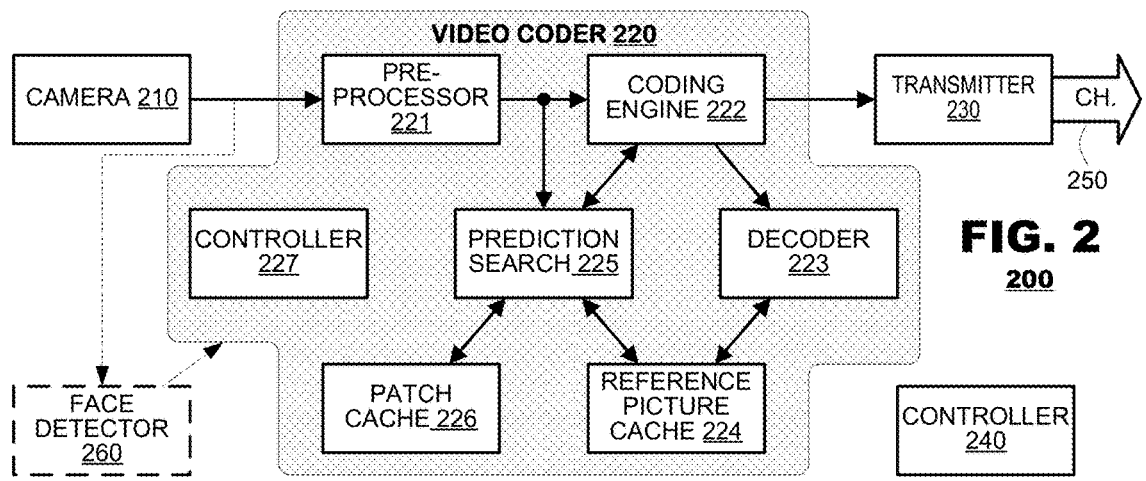
FIG. 2 is a simplified functional block diagram of an encoder according to an embodiment of the present invention.

FIG. 2 is a simplified functional block diagram of an encoder 200 operable to capture and code video according to an embodiment of the present invention. The encoder 200 may include a camera 210, a video coder 220 and a transmitter 230 operating under control of a controller 240. The camera 210 may capture image information at the encoder 200 and generate a video sequence therefrom. The video coder 220 may code the video sequence and may deliver coded data to the transmitter 230. As part of its operation, the video coder 220 may code the video data using motion compensated prediction techniques. The transmitter 230 may merge the coded video data provided by the video coder 220 with other data stream(s) provided by audio codecs or other data sources (not shown) and may format the data for transmission to another terminal via a channel 250.

An encoder 200 may be provided within each terminal 110, 120 illustrated in FIG. 1 to capture video locally and code it for transmission to the other terminal.

As illustrated, the video coder 220 may include a pre-processor 221, a coding engine 222, a local decoder 223, a reference picture cache 224, prediction search unit 225, a patch cache 226 and a controller 227. The pre-processor 221 may accept source video from the camera 210 and may perform various processing operations on the source video to condition it for coding. The coding engine 222 may perform compression operations on the pre-processed video to reduce spatial and/or temporal redundancies therein. The coding engine 222 may output coded video data to the transmitter 230. The decoder 223 may decode coded video data of select frames, designated as reference frames, and may store the recovered reference frame data in the reference picture cache 224 for use in coding later-received video. The patch cache 226 may store other data that has been designated for use as prediction references for the video sequence.

As part of the coding operation, the prediction search unit 225 may establish prediction references for frames being coded. Specifically, the prediction search unit 225 may search among data stored in the reference prediction cache 224 and/or the patch cache 226 to find appropriate prediction reference(s) for new frames being coded. The prediction search unit 225 also may generate metadata, such as frame/patch identifiers and motion vectors, to identify a source of prediction data within the reference picture cache 224 or the patch cache 226. The metadata may be integrated with the coded video data and transmitted to a decoder (not shown) for use in decoding the coded video data.

The pre-processor 221 may perform a variety of video processing operations on the source video output from the camera to condition the source video for coding. The pre-processor 221 may include an array of filters (not shown) such as de-noising filters, sharpening filters, smoothing filters, bilateral filters and the like, that may be applied dynamically to the source video based on characteristics observed within the video. The pre-processor 221 may coordinate with the controller 227 to review the source video data from the camera and select one or more of the filters for application. Typically, the pre-processor 221 conditions the source video data to render compression more efficient or to preserve image quality in light of data losses that may be incurred as the coding engine 222 operates.

The coding engine 222 may code input video data according to a variety of different coding techniques to achieve compression. The coding engine 222 may compress the images by a motion-compensated prediction. Frames of the input video may be assigned a coding type, such as intra-coding (I-coding), uni-directionally predictive coding (P-coding) or bi-directionally predictive coding (B-coding). The frames further may be parsed into a plurality of pixel blocks and may be coded by transform coding, quantization and entropy coding. The coding engine 222 may select quantization parameters in cooperation with the controller 227, which truncate low-energy transform coefficients. Pixel blocks of P- and B-coded frames may be coded predictively, in which case, the coding engine may calculate motion vectors identifying pixel blocks of decoded frames stored in the reference picture cache 224 or patch cache 226 that serve as predictions of the pixel blocks being coded and may generate prediction residuals prior to engaging the transform coding.

The coding engine 222 further may designate that certain coded frames may be used as reference frames for use in coding later-received input frames. The decoder 223 may decode coded video data of the reference frames and store the video data recovered therefrom in the reference picture cache 224. In this manner, the video coder 220 has a decoded copy of the reference frame as it will be decoded at the video decoder (not shown in FIG. 2).

The patch cache 226 may store various "prediction patches," image content that are stored both at the video coder 220 and a video decoder (not shown in FIG. 2) and may serve as prediction references for frames being coded by the coding engine 222. The prediction patches may be predefined at the video coder 220 and decoder prior to establishment of a coding session. Alternatively, the prediction patches may be communicated by a video coder 220 to the video decoder at the onset of the coding session. Further, prediction patches also may be defined or revised by a video coder 220 to the video decoder during the course of a coding session as the video coder 220 codes and transmits video data to the video decoder. A variety of types of image content may be used for prediction patches, including face data, texture data and data copied from other applications resident on a terminal; these different embodiments are discussed below.

The transmitter 230 may transmit the coded video data to the channel 250. In so doing, the transmitter 230 may multiplex the coded video data with other data to be transmitted such as coded audio data and control data (sources not illustrated in FIG. 2). The transmitter 230 may perform channel coding operations such as error correction coding, interleaving, packetization and the like, and may modulate and transmit the data to the channel 250.

Figure 3:
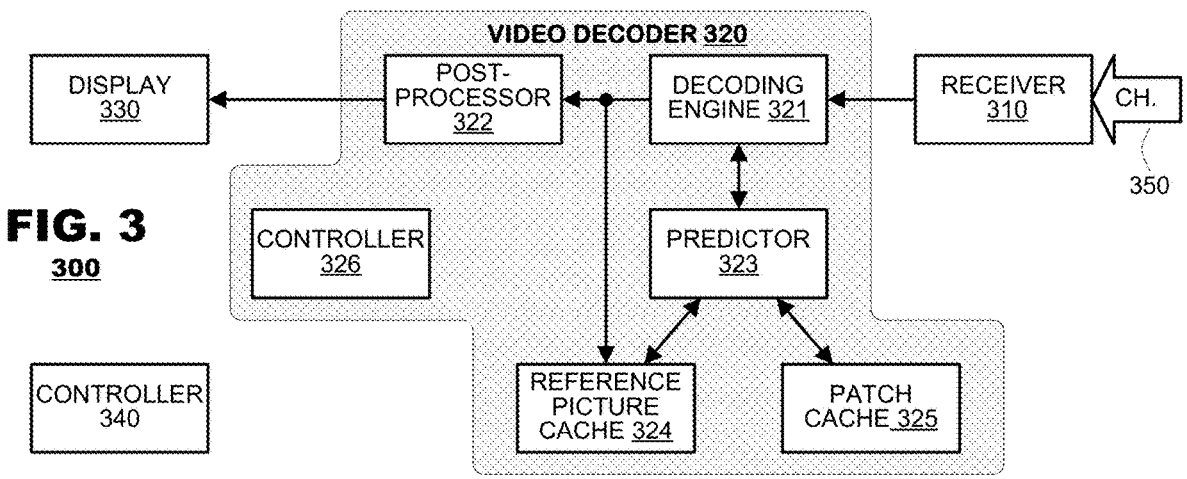
FIG. 3 is a simplified functional block diagram of a decoder according to an embodiment of the present invention.

FIG. 3 is a simplified functional block diagram of a decoder 300 operable to decode and render coded video according to an embodiment of the present invention. The decoder 300 may include a receiver 310, a video decoder 320 and a display 330 operating under control of a controller 340. The receiver 310 may receive a data stream from a channel 350, may parse the data stream into its constituent components (coded video, coded audio, etc.) and may distribute the different systems within the decoder 300. For example, the receiver 310 may supply the coded video data to the video decoder 320. The video decoder 320 may generate recovered video data from the coded video data. The video decoder 320 may output recovered video data to a display 330 for rendering or to storage (not shown) for later use. A decoder 300 may be provided within each terminal 110, 120 illustrated in FIG. 1 to receive coded video from the other terminal and to decode it for rendering.

The video decoder 320 may include a decoding engine 321, a post-processor 322, a predictor 323, a reference picture cache 324 and a patch cache 325 operating under control of a controller 326. The decoding engine 321 may perform decoding operations that invert coding operations performed by the coding engine 222 (FIG. 2). The decoding engine 321 may operate on a pixel block-by-pixel block basis to perform entropy decoding, dequantization and transform decoding on the coded video data. Quantization/dequantization operations are lossy processes and, therefore, recovered pixel block data likely will be a replica of the source pixel blocks that were coded by the video coder 222 but will include some error. For pixel blocks coded predictively, the transform decoding may generate residual data; the predictor 323 may interpret prediction references provided in the coded video data with the coded pixel blocks (which may be implied in some cases) to retrieve predicted pixel blocks from either the reference picture cache 324 or the patch cache 325 to be combined with the prediction residuals. Decoded pixel blocks may be reassembled into frames and output to the post-processor 322.

When the decoding engine 321 decodes new reference frames, it may store the recovered reference frames in the reference picture cache 324 for use in decoding subsequently-received coded video data.

The post-processor 322 may perform additional video processing to condition the recovered video data for rendering, commonly at a display device. Typical post-processing operations may include applying deblocking filters, edge detection filters, ringing filters and the like. The post-processor 322 may output recovered video sequence for rendering on the display 330 or, optionally, stored to memory for later retrieval and display.

The functional blocks illustrated in FIGS. 2 and 3 support video coding and decoding in one direction only. For bi-directional communication, each terminal 110, 120 (FIG. 1) may include functional blocks of both FIGS. 2 and 3. That is, a terminal 110 may include a camera 210, video coder 220, and transmitter 230 to capture video locally at the terminal 110, code the video and transmit it to the other terminal 120. The terminal 110 also may include a receiver 310, video decoder 320 and display 330 to receive coded video data transmitted by the terminal 120 (representing image data captured locally at terminal 120), decode the coded video data and render it locally at the terminal's display 330. Similarly, the terminal 120 may include its own camera 210, video coder 220 and transmitter 230 to capture video locally at the terminal 120, code it and transmit it to terminal 110. The terminal 120 also may include its own receiver 310, video decoder 320 and display 330 to receive, decode and render coded video data sent to it by the terminal 110.

Figure 4:
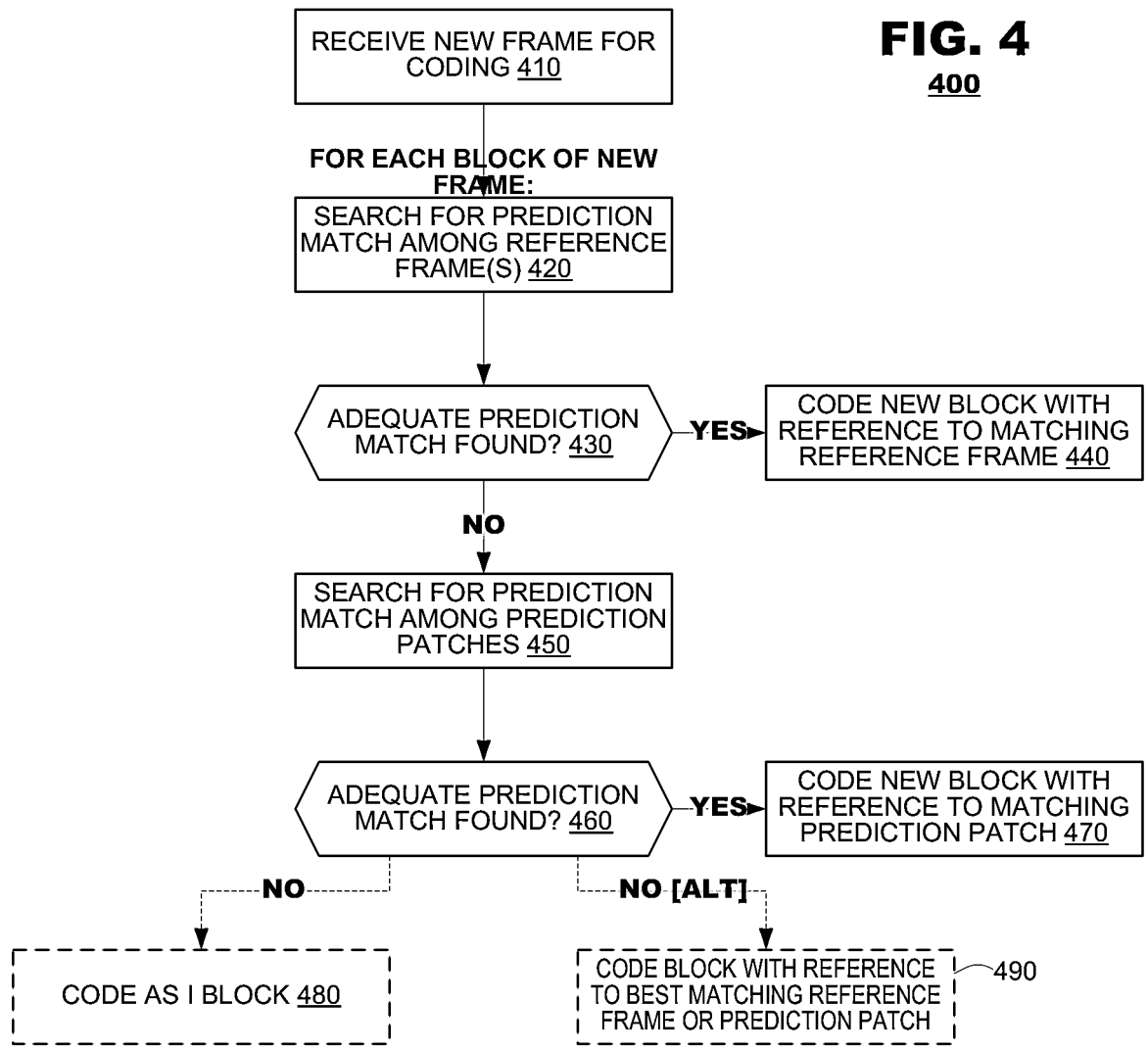
FIG. 4 illustrates a search method according to an embodiment of the present invention.

During coding, the prediction search unit 225 (FIG. 2) may perform methods similar to motion estimation to find the matching prediction references from among the patch cache 226. FIG. 4 illustrates a search method 400 according to one embodiment of the present invention. According to the method, a new frame to be coded is received (box 410). For each pixel block of the frame, the method 400 may search among the reference picture cache for a prediction reference for the pixel block being coded (box 420). Following the search, the method 400 may determine whether an adequate prediction match was found (box 430) and, if so, the method 400 may code the pixel block with reference to the matching data from the selected reference frame (box 440).

If an adequate prediction reference is not found within the reference picture cache, the method 400 may perform a search for a prediction match among the prediction patches stored in the patch cache (box 450). Following the search, the method 400 may determine whether an adequate prediction match was found (box 460). If so, the method 400 may code the pixel block with reference to the matching data from the selected prediction patch (box 470). If no adequate prediction match was found from either search, the method 400 may code the pixel block by another coding technique such as I coding (box 480). Alternatively, the method 400 may code the pixel block predictively using the reference frame or prediction patch uncovered by the searches of boxes 420, 450 that minimizes coding error (box 490).

In another embodiment, the method 400 may perform searches among the reference picture cache and the prediction cache (boxes 420, 450) in all cases and, thereafter, may select a prediction reference between the two searches based on coding efficiency.

Searches also may be augmented by data provided by local motion detectors (for example, gyroscopes, GPS systems and/or accelerometer), which provide indicators of camera speed during image capture and, by extension, degrees of motion in the video content. For example, each stored reference frame and/or patch may have stored with it data representing motion of the respective frame and/or patch. Searches among the reference picture cache and the prediction cache may be constrained to reference pictures and/or patches that exhibit similar degrees of motion as the pixel block being coded.

In another embodiment, a search method may select caches 224, 226 (FIG. 2) for initial search based on other criteria. For example, a method may search a patch cache library first for a portion of data that is identified as containing a type of object (say, a face) that matches a type of object stored in the patch cache 226. In a further embodiment, when prediction references are selected from one of the caches (say, the patch cache 226) for one frame, then for subsequent frames the prediction search unit 225 might search that cache 226 first until coding errors are detected that exceed some predetermined threshold.

In an embodiment, searches among the patch cache 226 may be augmented with metadata information (such as information about camera pose, camera motion, object type(s) detected in video, etc.) to reduce search complexity. Pixel patches may be transformed (such as by noise filtering, enhancement, 3D transformations, etc.) before being applied in coding as reference pixels.

Figure 5:
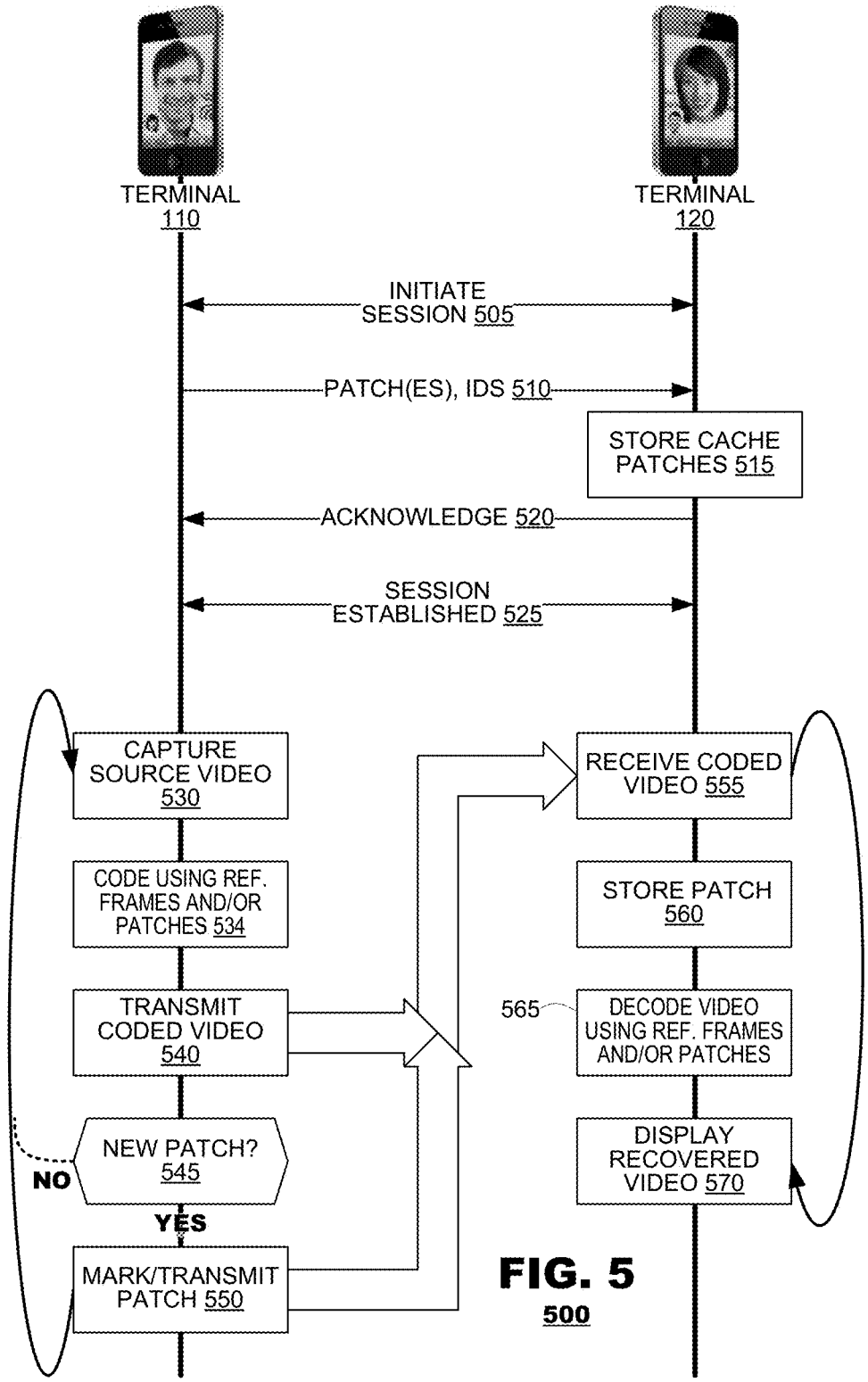
FIG. 5 illustrates a communication protocol according to one embodiment of the present invention.

As indicated, contents of the patch caches 226, 325 (FIGS. 2 and 3) may be exchanged between terminals, which allows terminals to define and redefine patches over time. FIG. 5 illustrates a communication protocol 500, according to one embodiment of the present invention, in which a first terminal 110 provides patches to a second terminal 120. As illustrated, according to the protocol 500, the terminals 110, 120 may exchange signaling to initiate a coding session (messaging 505). Typically, such signaling includes identification of capabilities of the terminals 1120, 120, identification of coding protocols to be used, identification of frame sizes generated by each of the terminals, etc. The terminal 110 may provide data representing the patches and identifiers of the patches (message 510) as part of the signaling, which may be stored at the terminal 120 (box 515) and may be acknowledged by the terminal 120 in a message 520. At some point thereafter, the terminals 110, 120 may exchange signaling (message 525) that indicates the session has been established successfully and coding may begin.

Active coding may include, at terminal 110, capturing source video, coding the video using reference frames and reference patches and transmitting coded video data to the other terminal 120 (boxes 530-540). The terminal 110 also may determine whether to build a new patch (box 545) and, if so, may mark coded data from which the patch is to be extracted (or simply may transmit the patch data expressly) in the coded video data (box 550). The coding process may operate recursively and the operations represented by boxes 530-550 may repeat until the coding session is terminated.

Patches also may be transmitted between terminals 110, 120 using implied signaling. In this embodiment, the terminals 110, 120 may operate according to a common rule set that defines triggering conditions for generation of new patches. The triggering conditions may be based on other elements of the coded video data. In a simple example, the triggering condition for patch generation may be based on a number of frames (or reference frames) being coded since a prior patch was created. When the triggering condition is met, both terminals 110, 120 may generate a new patch from predetermined elements of the coded channel data, also defined in the rule set, and may store the new patch in the terminals' respective patch caches. In this embodiment, it becomes unnecessary to send express designators in the channel data to identify when patches are to be created.

During active coding, the second terminal 120 may receive the coded video (box 555) and store any patches contained in the coded video to the patch cache (box 560). The terminal 120 also may decode video using references frames and prediction patches as indicated in the coded video data (box 565) and may display the recovered video (box 570). The coding process may operate recursively and the operations represented by boxes 555-570 may repeat until the coding session is terminated.

Thus, the patch library can be updated and synced between encoder and decoder by signaling the changes. Transformations on the patches can be transmitted via the bitstream. As an alternative to transmission of patches at start up (message 510), the terminals 110, 120 can start with known patch libraries which can be adapted or augmented during the course of transmission.

Figure 6:
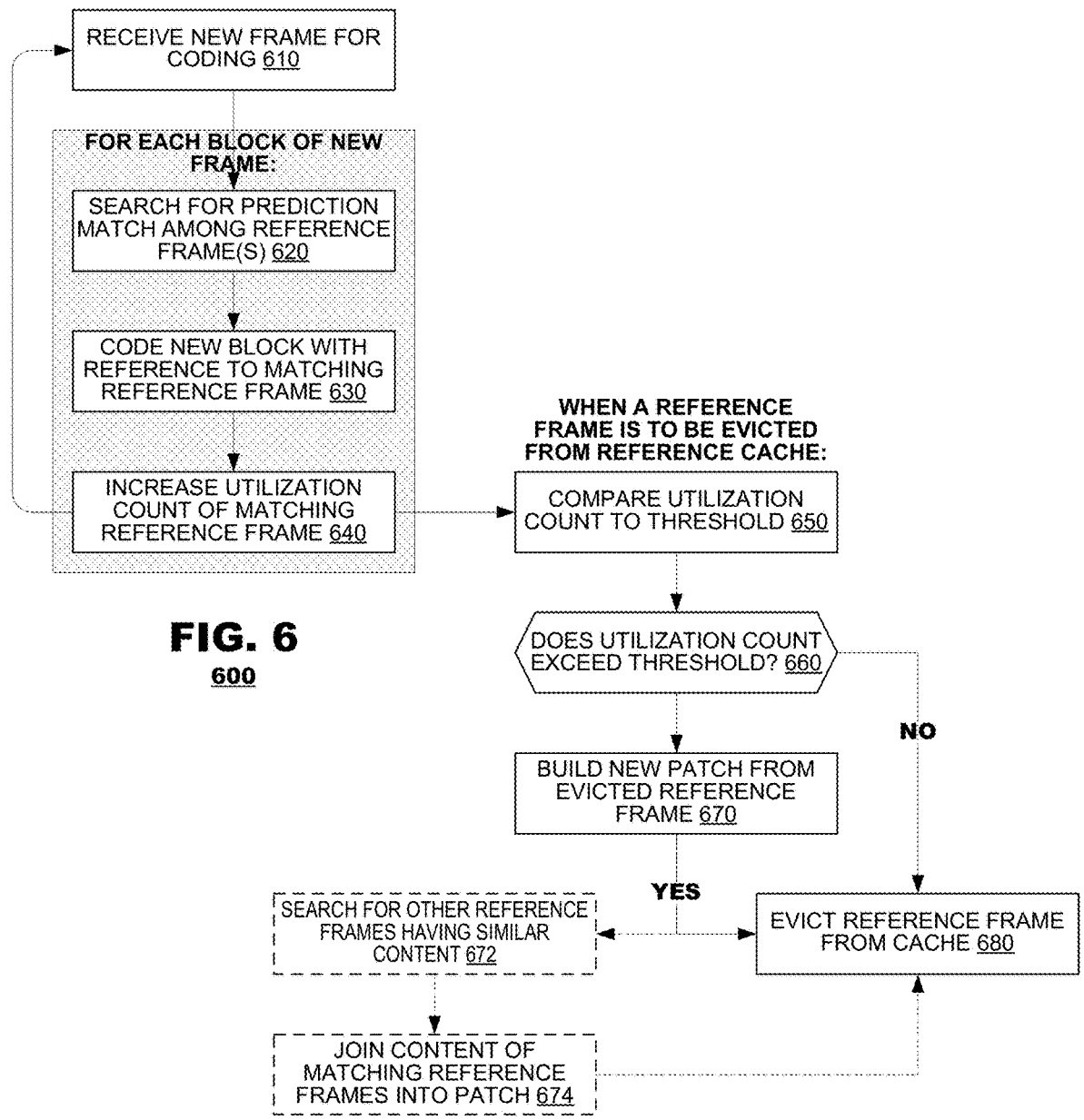
FIG. 6 illustrates a method for building patches according to an embodiment of the present invention.

FIG. 6 illustrates a method 600 for building patches, according to an embodiment of the present invention. As illustrated, the method 600 may begin when a new frame is available for coding (box 610). For each pixel block within the frame, the method may search for prediction references among locally-cached reference frames (box 620). When an appropriate prediction reference is found from among the reference frames, the method 600 may code the new pixel block using content from the identified reference frame(s) (box 630) and increase a utilization count of the reference frame so identified (block 640). Operation of boxes 610-640 may repeat as frames become available for coding.

As frames continue to be coded and the reference cache fills, the method 600 also may evict reference frames from the reference picture cache. When this occurs, the method 600 may determine whether to build a prediction patch from a reference picture to be coded. For example, the method 600 may compare the utilization count of the reference picture being evicted to a threshold and determine whether the utilization count exceeds the threshold (boxes 650-660). If the utilization count is exceeded, the method 600 may build a new patch from the reference frame to be evicted (box 670). Thereafter, or if the utilization count does not exceed the threshold, the method 600 may evict the reference picture from the cache (box 680).

Prediction patches may be constructed from reference pictures in a variety of ways. In a simple embodiment, the reference picture simply may be copied to the prediction cache (operation not shown). In another embodiment, the method 600 may attempt to detect objects or textures within the reference frame being evicted and may build a new prediction patch from the detected objects or detected textures (operation not shown). In yet another embodiment, illustrated in FIG. 6, the method 600 may build a prediction patch from possibly many stored reference frames. The method 600 may search within the reference picture cache to identify whether the reference picture cache stores other frames that are similar to the reference picture being evicted (box 672). If multiple reference pictures are identified from the search, the method 600 may build a new prediction patch from the content of these related reference frames (box 674).

As discussed, contents of the patch caches 226, 325 may represent a reference library of prediction patches that provide alternative sources of prediction for pixel blocks being coded. The prediction patches, therefore, may improve coding efficiency when the reference frames stored in the reference caches 224, 324 do not provide adequate prediction references for new frames to be coded. The prediction patches can be of arbitrary size; they need not be the same size as the frames being coded. The prediction patches can (but need not) be derived from one or more frames of the input video sequence. The prediction patches may be generated from a variety of different sources.

In another embodiment, the prediction patches can be derived from image content stored locally in the terminal that performs the encoding. A patch may be derived from a single frame or from multiple frames. The reference library may be constructed from data of previously coded frames or prior coding sessions. Representative examples of patch libraries follow:

One example of a reference library is a face library. Such a library can be constructed by storing data of faces detected in previously-coded frames or in prior coding sessions. In this embodiment, an encoder 200 (FIG. 2) may include a face detector 260 that operates in conjunction with the camera 210 and video coder 220. When a face is detected, the face data may be stored in the patch cache 226 at an encoder 200 and communicated to a decoder 300 (FIG. 3) for storage in the remote patch cache 325. In one embodiment, reconstructed data of the detected face may be generated by the decoder 223 and stored in the patch cache 226 (path not shown). The controller 227 may cause coded data of the face to be marked in the coded video data as a prediction patch whereupon a decoder 300 (FIG. 3) may store recovered data of the face in the decoder's patch cache 325. When coding blocks within the face area of a new frame, the encoder 200 can search the patch cache 226 library to determine whether the library contains an appropriate prediction reference and code the new frame when such a prediction reference is found.

During coding, face references in the patch cache library can be transformed through 3D warping, scaling, rotating, filtering, etc., to match the size of a detected face in a new frame being coded to the size of a matching face in the patch cache library. Due to face movement and camera motion, an encoder 200 may not always identify prediction references of a face using traditional motion searches within a reference picture cache 224 of limited depth. Application of a patch cache 226 that stores a large number of reconstructed faces can improve the quality of an encoder's prediction. In this example, only the face region need be stored and searched and, therefore, the performance impact and memory requirements of the patch cache 226 is expected to be lower than doing traditional motion searches over a large number of reference frames in a reference picture cache 224. The performance impact can be further reduced by pre-selecting likely matching faces using additional information that may be provided by a face detector 260 such as face orientation and smile/blink detection and metadata provided by a camera 210 or pre-processor 221 such as motion estimates, estimates of motion blur and the like.

Another example of a reference library is a texture library. The patch cache 226 may store a library of texture patterns that may be artificially constructed or be constructed by identifying texture from a current coding session or from previous coding sessions (video communication sessions). When the textures are artificially constructed, textures patterns may be predefined at the encoder 200 (FIG. 2) and decoder 300 (FIG. 3). When textures are constructed dynamically, texture patterns may be recognized by a video coder 220 (for example, by a process in the pre-processor 221) and marked in the coded video data. At a decoder 300

(FIG. 3), a post-processor 322 may extract texture data from recovered video data and store it in the patch cache 325 (path not shown).

The texture patterns can be grouped into different classes based on certain characteristics. For example, text characters can be identified as a first class, object shapes (vehicles, human body, etc.) may be identified as different classes, and the like. Texture patterns can be classified also by the location in the image as they occur; this can be helpful in improving the perception of resolution of salient textures. The performance impact can be further reduced by pre-selecting likely matching textures and texture classes using side-information that may be provided by the pre-processor 221, such as geographic location, neighboring texture classes, correlation among different texture classes, etc.

During coding, stored texture data may be subject to processing, which may include scaling, rotation, smoothing, sharpening, etc., prior to use as a prediction reference. Indices of the texture patterns as stored in the patch cache 226 can be sorted by how frequently they match the coded blocks in previous frames, in order to reduce the overhead of signaling the indices.

The principles of the present invention find application with object detectors of other types, beyond the face and texture recognition systems discussed hereinabove. Moreover, such detectors and patch coders may be augmented by data provided by local motion detectors (for example, gyroscopes, GPS systems and/or accelerometer), which provide indicators of camera speed during image capture and, by extension, degrees of motion in the video content.

Figure 7:
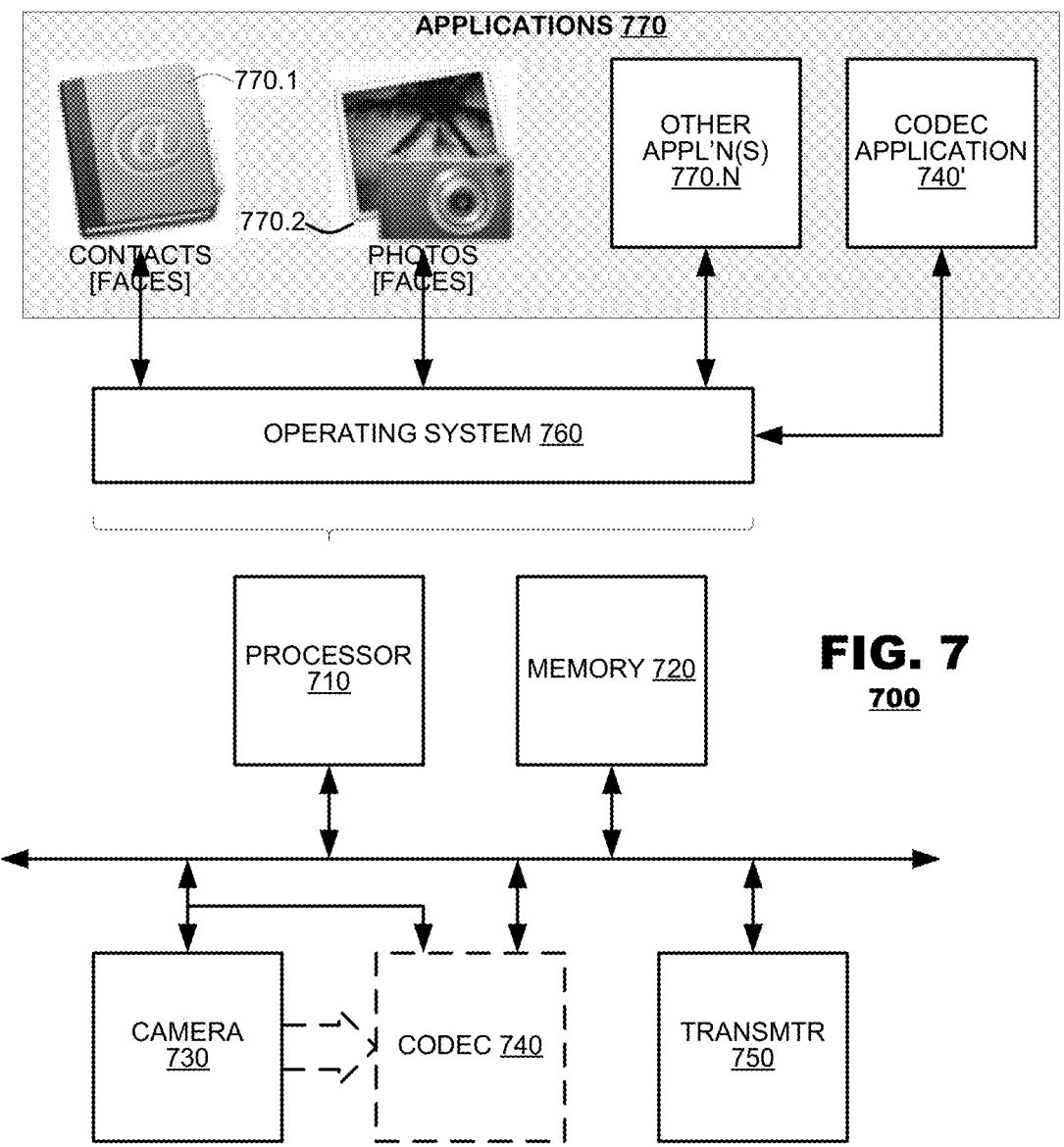
FIG. 7 is a simplified block diagram of a terminal according to another embodiment of the present invention.

In another embodiment, the patch cache may be initialized with data known privately to the terminals 110, 120 (FIG. 1). For example, the terminals 110, 120 may execute applications and store data associated with those applications that can be leveraged to build the patch caches of the prior embodiments. FIG. 7 is a simplified block diagram of a terminal 700 according to such an embodiment. As illustrated in FIG. 7, the terminal 700 may include a processor 710, a memory system 720, camera 730, codec 740 and transmitter 750. The memory system 720 may store instructions that define an operating system 760, application programs and application data (collectively "applications') 770 within the terminal 700. Implementations of the terminal 700 may vary; for example, the codec 740 may be provided as a hardware component within the terminal 700 separate from the processor 710 or it may be provided as an application program (labeled 740') within the terminal 700. The principles of the present invention find application with either embodiment.

As part of their operation, applications 770 may store data that includes video elements that can be leveraged for use as prediction patches. For example, a terminal 700 may include a contacts application 770.1 storing data of the personal contacts of an operator of the terminal. Further, the terminal 700 may include a photo manager application 770.2 storing tagged images of persons known to the operator. And, indeed, the images of these applications may be synched with images stored on terminals of other users.

When a video coding session is initiated between terminals of two users, the terminals may exchange identifiers of the other terminals and may populate the picture caches 224, 324 (FIGS. 2, 3) using images derived from those of the applications 770. For example, the terminals may exchange signaling identifying the terminals' operators and identifying images stored by each. If the terminals each store an image in common that represent one of the operators, the terminals 110, 120 may build a patch from the image and store it in their respective patch caches. In so doing, the terminals may seed their patch caches without requiring an express exchange of patch data.

The terminals also may use data from the patch caches in response to aberrant system behavior. For example, channel conditions may fluctuate during the course of a video coding session which can affect the amount of bandwidth available to the terminals. Under extreme low bandwidth, an encoder may enter a mode in which it does not code any residual information to a decoder. Instead, the encoder can send information that indicates transformation of reference frames or reference libraries of the patch cache, to construct video frames to be displayed at the receiver side.

The foregoing discussion has described operation of the embodiments of the present invention in the context of coders and decoders. Commonly, video coders are provided as electronic devices. They can be embodied in integrated circuits, such as application specific integrated circuits, field programmable gate arrays and/or digital signal processors. Alternatively, they can be embodied in computer programs that execute on personal computers, notebook or tablet computers or computer servers. Similarly, decoders can be embodied in integrated circuits, such as application specific integrated circuits, field programmable gate arrays and/or digital signal processors, or they can be embodied in computer programs that execute on personal computers, notebook computers or computer servers. Decoders commonly are packaged in consumer electronic devices, such as gaming systems, smartphones, DVD players, portable media players and the like, and they also can be packaged in consumer software applications such as video games, browser-based media players and the like.

Several embodiments of the invention are specifically illustrated and/or described herein. However, it will be appreciated that modifications and variations of the invention are covered by the above teachings and within the purview of the appended claims without departing from the spirit and intended scope of the invention.

We claim:

1. An encoder apparatus, comprising:
  a reference picture cache that stores decoded reference pictures;
  a patch cache that stores prediction patches; and
  a processor executing instructions stored in a memory that cause:
  exchanging signaling with a remote decoder to establish a coding session,
  prior to exchanging coded video data with the remote decoder pursuant to the coding session, storing video content in the patch cache of the encoder apparatus,
  after the coding session is established:
  coding an input video sequence according to predictive coding techniques;
  decoding the coded video data of reference pictures generated by the coding and storing the decoded reference pictures in the reference picture cache of the encoder apparatus;
  as part of the coding of a video element of the input video sequence, generating a prediction reference for the video element:
  first searching, from among the reference picture cache, for the prediction reference for the video element,
  if the prediction reference is not found in the reference picture cache, second searching, from among the patch cache for the prediction reference for the video element, and selecting, for the video element, the prediction reference from results of the first and second searchings, wherein the coding of the video element uses the selected prediction reference as a basis of the predictive coding techniques; and transmitting the coded video data to a channel.

2. The encoder of claim 1, wherein the stored prediction patches are derived from an identification of a predetermined type of an object.

3. The encoder of claim 2, wherein the object type is a face.

4. The encoder of claim 2, wherein the object type is a text.

5. The encoder of claim 1, wherein the stored prediction patches are derived from application data stored within a terminal.

6. The encoder of claim 1, wherein the stored prediction patches are predefined at a terminal prior to an onset of a video coding session.

7. The encoder of claim 1, wherein the stored prediction patches are derived from a prior video coding session.

8. The encoder of claim 1, wherein a prediction reference selector searches among the reference picture cache first to identify the prediction references for the input video to be coded and searches among the patch cache second.

9. The encoder of claim 1, wherein the prediction reference selector searches among the reference picture cache and the patch cache in an order determined by an object detector.

10. The encoder of claim 1, wherein the prediction selector searches the patch cache if a low correlation is achieved by searching the reference picture cache.

11. The encoder of claim 1, wherein data is stored in the patch cache for a longer duration than data in the reference picture cache.

12. The encoder of claim 1, wherein the stored prediction patches are derived from a data of a contacts application installed on a device that includes the encoder apparatus.

13. The encoder of claim 1, wherein the stored prediction patches are derived from a data of a photo management application installed on a device that includes the encoder apparatus.

14. The encoder of claim 1, wherein a source of prediction patches include decoded frames from a previously-terminated coding session.

15. The encoder of claim 1, wherein the prediction patches include video content.

16. A decoder apparatus, comprising:
a reference picture cache that stores decoded reference pictures;
a patch cache that stores prediction patches; and
a processor executing instructions stored in a memory that cause:
exchanging signaling with an encoder to establish a decoding session,
prior to exchanging coded video data with the encoder pursuant to the decoding session, storing video content in the patch cache of the decoder apparatus,
decoding a coded video sequence, received from the encoder, according to predictive coding techniques,
storing decoded data for the decoded reference pictures in the reference picture cache, and
as part of the decoding of a video element of the coded video data, generating a prediction for the video element by retrieving data from one of the reference picture cache and the patch cache based on a prediction reference included in the coded video sequence, wherein the decoding of the video element uses the selected prediction reference as a basis of the predictive decoding.

17. The decoder of claim 16, wherein the stored prediction patches are derived from a predetermined type of an object.

18. The decoder of claim 17, wherein the object type is a face.

19. The decoder of claim 17, wherein the object type is a text.

20. The decoder of claim 16, wherein the stored prediction patches are derived from application data stored within a terminal.

21. The decoder of claim 16, wherein the stored prediction patches are derived from the coded video data.

22. The decoder of claim 16, wherein the stored prediction patches are predefined at a terminal prior to an onset of a decoding session.

23. The decoder of claim 16, wherein the stored prediction patches are derived from a prior video coding session.

24. The decoder of claim 16, wherein the stored prediction patches are derived from a data of a contacts application installed on a device that includes the decoder apparatus.

25. The decoder of claim 16, wherein the stored prediction patches are derived from a data of a photo management application installed on a device that includes the decoder apparatus.

26. The decoder of claim 16, wherein a source of prediction patches include decoded frames from a previously-terminated decoding session.

27. A non-transitory computer readable medium storing program instructions that, when executed by a processor, cause the processor to perform a video coding method, comprising:
exchanging signaling with a remote decoder to establish a coding session,
prior to exchanging coded video data with the remote decoder pursuant to the coding session, storing video content in the patch cache of an encoder,
after the coding session is established:
coding an input video sequence according to predictive coding techniques;
decoding the coded video data of reference pictures generated by the coding and storing the decoded reference pictures in the reference picture cache of the encoder;
as part of the coding of a video element of the input video sequence, generating a prediction reference for the video element:
first searching, from among the reference picture cache, for the prediction reference for the video element,
if the prediction reference is not found in the reference picture cache, second searching, from among the patch cache for the prediction reference for the video element, and
selecting, for the video element, the prediction reference from results of the first and second searchings, wherein the coding of the video element uses the selected prediction reference as a basis of the predictive coding techniques; and
transmitting the coded video data to a channel.

28. The medium of claim 27, wherein the stored video content is derived from a data of a contacts application installed on a device.

29. The medium of claim 27, wherein the stored video content is derived from a data of a photo management application installed on a device.

30. The medium of claim 27, wherein the stored video content includes decoded frames from a previously-terminated coding session.

31. A non-transitory computer readable medium storing program instructions that, when executed by a processor, cause the processor to perform a video decoding method, comprising:
exchanging signaling with an encoder to establish a decoding session,
prior to exchanging coded video data with the encoder pursuant to the decoding session, storing video content in a patch cache of a decoder,
decoding a coded video sequence, received from the encoder, according to predictive coding techniques,
storing decoded data for the decoded reference pictures in a reference picture cache, and
as part of the decoding of a video element of the coded video data, generating a prediction for the video element by retrieving data from one of the reference picture cache and the patch cache based on a prediction reference included in the coded video sequence, wherein the decoding of the video element uses the selected prediction reference as a basis of the predictive decoding.

32. The medium of claim 31, wherein the stored video content is derived from a data of a contacts application installed on a device.

33. The medium of claim 31, wherein the stored video content includes decoded frames from a previously-terminated coding session.

34. The medium of claim 31, wherein the stored video content is derived from a data of a photo management application installed on a device.

35. A video coding method, comprising, by an encoder:
exchanging signaling with a decoder to establish a coding session,
prior to exchanging coded video data with the decoder pursuant to the coding session, storing video content as prediction patches in a patch cache of the encoder,
after the coding session is established:
coding an input video sequence according to predictive coding techniques;
decoding the coded video data of reference pictures generated by the coding and storing the decoded reference pictures in a reference picture cache of the encoder;
as part of the coding of a video element of the input video sequence, generating a prediction reference for the video element:
first searching, from among the reference picture cache, for the prediction reference for the video element,
if the prediction reference is not found in the reference picture cache, second searching, from among the patch cache for the prediction reference for the video element, and selecting, for the video element, the prediction reference from results of the first and second searchings, wherein the coding of the video element uses the selected prediction reference as a basis of the predictive coding techniques; and
transmitting the coded video data to a channel.

36. The method of claim 35, wherein the stored prediction patches are derived from an identification of a predetermined type of an object.

37. The method of claim 36, wherein the object type is a face.

38. The method of claim 36, wherein the object type is a text.

39. The method of claim 35, wherein the stored prediction patches are derived from data of an application program.

40. The method of claim 35, wherein the stored prediction patches are predefined prior to an onset of a video coding session.

41. The method of claim 35, wherein the stored prediction patches are derived from a video coding session performed prior to a current video coding session.

42. The method of claim 35, wherein the searches among the reference picture cache and the patch cache occur in an order determined by an object detection performed on the video element.

43. The method of claim 35, further comprising, if a new patch is stored in the patch cache, transmitting the new patch to the channel.

44. The method of claim 35, further comprising, when a new patch is derived from contents of a stored reference picture, transmitting a notification of the new patch to the channel.

45. The method of claim 35, further comprising, when a new video coding session is created, transmitting contents of the patch cache to the channel.

46. The method of claim 35, wherein the stored video content is derived from a data of a contacts application installed on a device.

47. The method of claim 35, wherein the stored video content is derived from a data of a photo management application installed on a device.

48. The method of claim 35, wherein the stored video content includes decoded frames from a previously-terminated coding session.

49. A video decoding method, comprising, by a decoder:
exchanging signaling with an encoder to establish a decoding session,
prior to exchanging coded video data with the encoder pursuant to the decoding session, storing video content as prediction patches in a patch cache of the decoder,
decoding a coded video sequence, received from the encoder, according to predictive coding techniques;
storing decoded data for the decoded reference pictures in a reference picture cache; and
as part of the decoding of a video element of the coded video data, generating a prediction for the video element by retrieving data from one of the reference picture cache and the patch cache based on a prediction reference included in the coded video sequence, wherein the decoding of the video element uses the selected prediction reference as a basis of the predictive decoding.

50. The method of claim 49, wherein the storing of video content in the patch cache of the decoder occurs after initiating the coding session and before establishing the coding session.

51. The method of claim 49, wherein the stored prediction patches are derived from reconstructed video corresponding to a predetermined type of an object detected therein.

52. The method of claim 51, wherein the object type is a face.

53. The method of claim 51, wherein the object type is a text.

54. The method of claim 49, wherein the stored prediction patches are derived from application data stored within a terminal.

55. The method of claim 49, wherein the stored prediction patches are derived from the coded video data.

56. The method of claim 49, wherein the stored prediction patches are predefined prior to an onset of a video coding session.

57. The method of claim 49, wherein the stored prediction patches are derived from a prior video coding session.

58. The method of claim 49, further comprising, receiving a new patch via the channel and storing the patch in the patch cache.

59. The method of claim 49, further comprising receiving a notification of a new patch via the channel and storing reconstructed video data identified by the notification in the patch cache.

60. The method of claim 49, comprising, when a new video coding session is created and prior to the decoding, receiving prediction patches via the channel and storing them to the patch cache.

61. The method of claim 49, wherein the stored video content is derived from a data of a contacts application installed on a device.

62. The method of claim 49, wherein the stored video content is derived from a data of a photo management application installed on a device.

63. The method of claim 49, wherein the stored video content includes decoded frames from a previously-terminated decoding session.

* * * * *